(12) United States Patent
Aiello et al.

(10) Patent No.: US 7,518,276 B2
(45) Date of Patent: Apr. 14, 2009

(54) SINGLE THRUST MAGNETICALLY BIASED FULLY RECIRCULATING SELF PURGING FLUID DYNAMIC BEARING MOTOR

(75) Inventors: Anthony J. Aiello, Santa Cruz, CA (US); Alan Lyndon Grantz, Aptos, CA (US); Klaus D. Kloeppel, Watsonville, CA (US); Paco Flores, Felton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/508,400

(22) Filed: Aug. 22, 2006

(65) Prior Publication Data

US 2006/0284504 A1 Dec. 21, 2006

Related U.S. Application Data

(62) Division of application No. 10/348,691, filed on Jan. 21, 2003, now Pat. No. 7,095,147.

(51) Int. Cl.
*H02K 5/16* (2006.01)
(52) U.S. Cl. ............................................... 310/90
(58) Field of Classification Search ............. 310/90, 310/90.5
See application file for complete search history.

(56) References Cited

U.S. PATENT DOCUMENTS

| 4,557,610 | A | 12/1985 | Asada et al. | |
|---|---|---|---|---|
| 5,272,403 | A | 12/1993 | New | |
| 5,559,382 | A * | 9/1996 | Oku et al. | 310/90 |
| 5,667,309 | A | 9/1997 | Nose | |
| 6,154,339 | A * | 11/2000 | Grantz et al. | 360/99.08 |
| 6,211,592 | B1 | 4/2001 | Ichiyama | |
| 6,265,798 | B1 * | 7/2001 | Huang et al. | 310/90.5 |
| 6,339,270 | B1 | 1/2002 | Ichiyama | |
| 6,364,532 | B1 | 4/2002 | Yoshikawa et al. | |
| 6,493,181 | B1 * | 12/2002 | Ichiyama | 360/99.08 |
| 6,498,412 | B2 * | 12/2002 | Horng | 310/91 |
| 6,686,674 | B2 * | 2/2004 | Ichiyama | 310/90 |
| 6,787,954 | B2 | 9/2004 | Yoshitsugu et al. | |
| 6,828,709 | B2 * | 12/2004 | Grantz et al. | 310/90 |

* cited by examiner

*Primary Examiner*—Nguyen N Hanh
(74) *Attorney, Agent, or Firm*—Michael S. Garrabrants; Noval Druce + Quigg LLP

(57) ABSTRACT

A fluid dynamic bearing motor features a stationary assembly, a rotating assembly supported on the stationary assembly, a fluid dynamic bearing system in a gap between the stationary and rotating assemblies, a radial capillary seal defined proximate a first end of the journal gap, and at least one re-circulation hole extending from the radial capillary seal to a second end of the journal gap. A single thrust shaft end bearing which pressurizes the shaft end to create an axial thrust bearing and drive bubbles in the fluid (where the fluid is a liquid) to the outer diameter of the shaft and into the recirculation path. The journal may be supported for rotation by dual sets of grooves; the dual groove asymmetry in the journal maintains a positive pressure between the journals.

20 Claims, 8 Drawing Sheets

SINGLE THRUST MAGNETICALLY BIASED FULLY RECIRCULATING SELF PURGING FLUID DYNAMIC BEARING MOTOR

CROSS-REFERENCE TO RELATED APPLICATIONS

This application is a division of U.S. application Ser. No. 10/348,691, filed Jan. 21, 2003, the disclosures of which are incorporated herein in their entirety.

FIELD OF THE INVENTION

The invention generally relates to electric motors and, more particularly, to electric motors for disk drives having fluid dynamic bearings.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Over the years, storage density has tended to increase, and the size of the storage system has tended to decrease. This trend has lead to greater precision and lower tolerance in the manufacturing and operating of magnetic storage disks. For example, to achieve increased storage densities, the read/write heads must be placed increasingly close to the surface of the storage disk. This proximity requires that the disk rotate substantially in a single plane.

From the foregoing discussion, it can be seen that the bearing assembly that supports the storage disk is of critical importance. One bearing design is a fluid dynamic bearing. In a fluid dynamic bearing, a lubricating fluid such as air or liquid provides a bearing surface between a fixed member of the housing and a rotating member of the disk hub. In addition to air, typical lubricants include gas, oil, or other fluids. The relatively rotating members may comprise bearing surfaces with fluid dynamic grooves formed on the members themselves. Fluid dynamic bearings spread the bearing surface over a large surface area, as opposed to a ball bearing assembly, which comprises a series of point interfaces. The use of fluid in the interface area imparts damping effects to the bearing, which helps to reduce non-repeatable run-out. Thus, fluid dynamic bearings are an advantageous bearing system.

However, fluid dynamic bearing designs are susceptible to problems caused by manufacturing tolerance variations in bearing (and bearing groove) geometry. These problems include variations in pressure produced in the journal bearing and a possible entrapment of air bubbles in the fluid (where the fluid is a liquid) itself. Both of the stated problems may be avoided by providing a fluid dynamic bearing with a fluid re-circulation path to an external environment.

Therefore, a need exists for a fluid dynamic bearing design that utilizes capillary seals combined with fluid re-circulation. Furthermore, a bearing design that can do so while eliminating any air that enters the fluid bearing system is desirable to prolong motor life.

SUMMARY OF THE INVENTION

The invention comprises a fluid dynamic bearing motor featuring a stationary assembly, a rotating assembly supported on the stationary assembly, a fluid dynamic bearing system in a gap between the stationary and rotating assemblies, a radial capillary seal defined proximate a first end of the journal gap, and at least one re-circulation hole extending from the radial capillary seal to a second end of the journal gap.

In a preferred embodiment, the design further comprises a single thrust shaft end bearing which pressurizes the shaft end to create an axial thrust bearing and drive bubbles in the fluid (where the fluid is a liquid) to the outer diameter of the shaft and into the recirculation path.

In a further enhancement to the design, the journal is supported for rotation by dual sets of grooves; the dual groove asymmetry in the journal maintains a positive pressure between the journals.

In another alternative enhancement to the design, the downward journal flow established by the dual groove patterns establishes a flow which returns through the outer recirculation hole to the radial capillary seal, and then to the journal, purging any bubbles from the fluid circulation path out through the capillary seal.

In another alternative enhancement to the design, a downward bias force is produced by an appropriate magnetic field; preferably a stator/magnet offset between the stator supported from the base and the magnet supported from the rotating hub reliably sets the thrust bearing gap when the magnetic bias force and the thrust bearing pressure force equilibrate in balance with the axial thrust bearing.

BRIEF DESCRIPTION OF THE DRAWINGS

So that the manner in which the embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
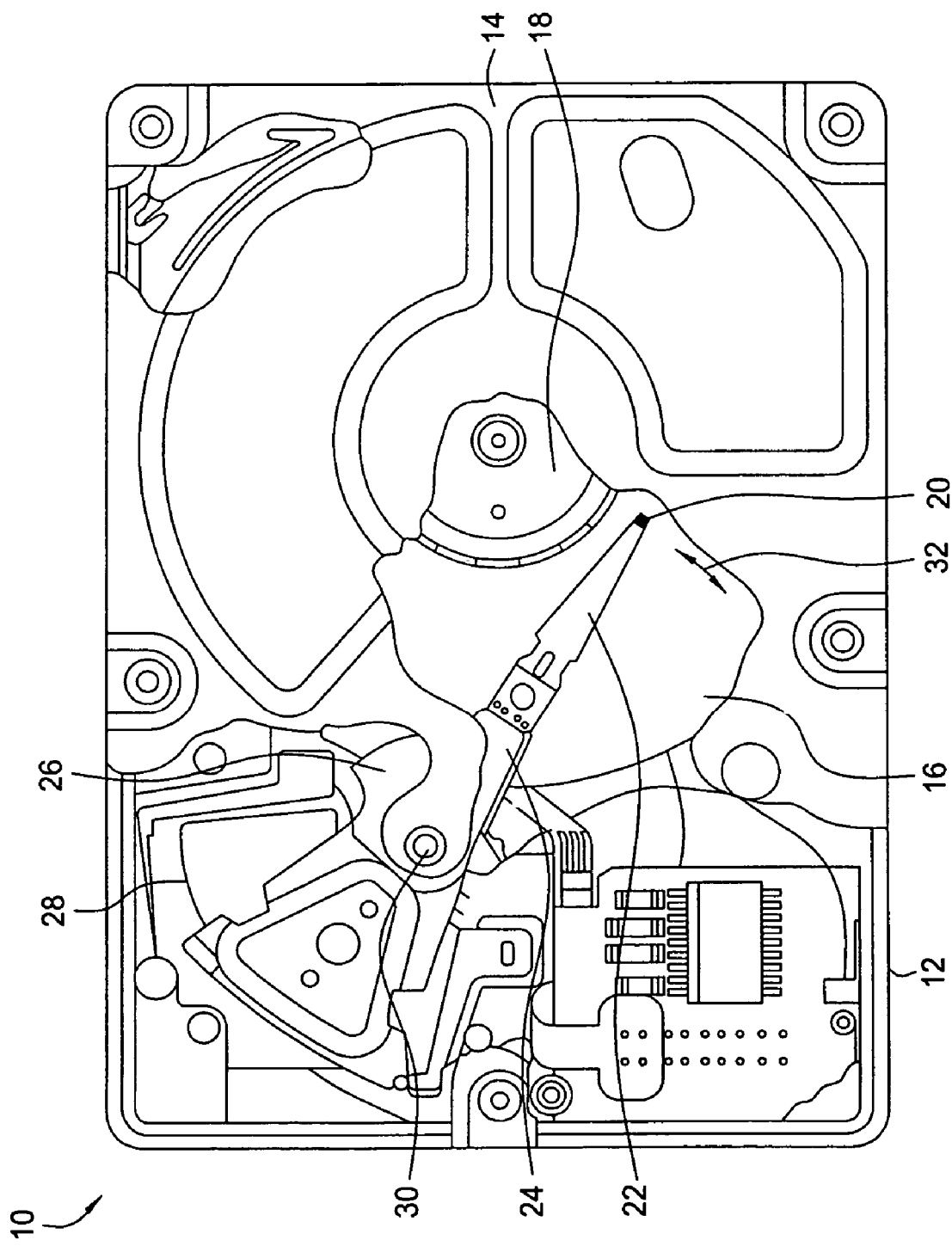
FIG. 1 depicts a plan view of one embodiment of a disk drive that comprises a motor in which the invention is used.
Figure 2:
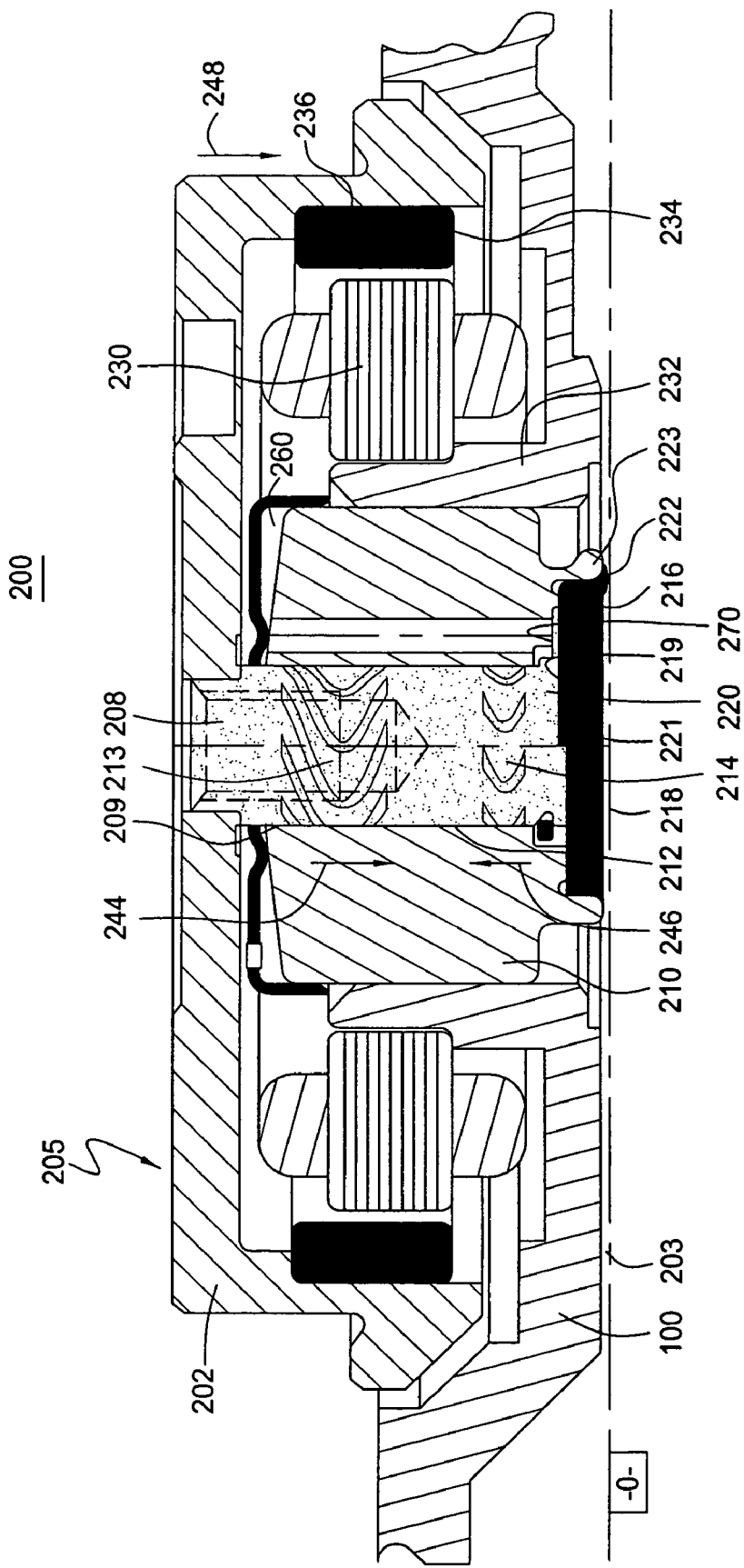
FIG. 2 depicts a partial cross-sectional view of two embodiments in a split view of a fluid dynamic bearing motor according to the present invention.

FIG. 1 depicts a plan view of one embodiment of a disk drive 10 for use with embodiments of the invention. Referring to FIG. 1, the disk drive 10 includes a housing base 12 and a top cover plate 14. The housing base 12 is combined with cover plate 14 to form a sealed environment to protect the internal components from contamination by elements outside the sealed environment. The base and cover plate arrangement shown in FIG. 1 is well known in the industry; however, other arrangements of the housing components have frequently been used, and aspects of the invention are not limited by the particular configuration of the disk drive housing. Disk drive 10 further includes a disk pack 16 that is mounted on a hub 202 (see FIG. 2) for rotation on a spindle motor (not shown) by a disk clamp 18. Disk pack 16 includes one or more of individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32. FIG. 2 is a sectional sideview of fluid dynamic bearing motor 200 according to an embodiment of the present invention.

In FIG. 2 the motor 200 comprises a rotating assembly 205, a stationary assembly 203, and a fluid bearing assembly. The rotating assembly 205 comprises a hub 202 that supports at least one disc for rotation, and a shaft 208 affixed to the hub that rotates with the hub. The shaft 208 rotates within a sleeve 210 and is supported for rotation by a fluid bearing assembly to be described in detail below. The outer surface 209 of the shaft 208 and the adjacent bore 212 of sleeve 210 together form fluid dynamic bearings 213, 214. The dual reference numbers are used because the journal bearings are typically in two grooved sections as shown. That is, the journal bearings 213, 214 each include a grooved surface; the grooved surface may be provided either on the outer surface 209 of the shaft 208 or inner bore surface 212 of sleeve 210. As can also be seen in FIG. 2, each of the grooves in the bearings 213, 214 is closed at one end (usually the end distal from the groove separator) and closed at the other. This facilitates formation of the grooves using electrochemical machining, and makes their operation more efficient.

A counterplate 216 is mounted (by laser welding or bonding, or other means) to the sleeve 210 adjacent an end surface 218 of the shaft 208. The counterplate 216 has an axially facing surface 220 which faces the end of the shaft and cooperates with the shaft end surface 218 to define a gap in which fluid is pressurized during operation of the shaft. The counterplate 216 is sealed typically by a weld or other means 222 to a shoulder 223 of sleeve 210 to prevent any loss of the bearing fluid. In order to create an axial thrust force inwardly pumping spiral grooves 300 as are known in this field are preferably defined on one of the end surface of the shaft or the axially facing surface 220 of the counterplate.

Figure 3:
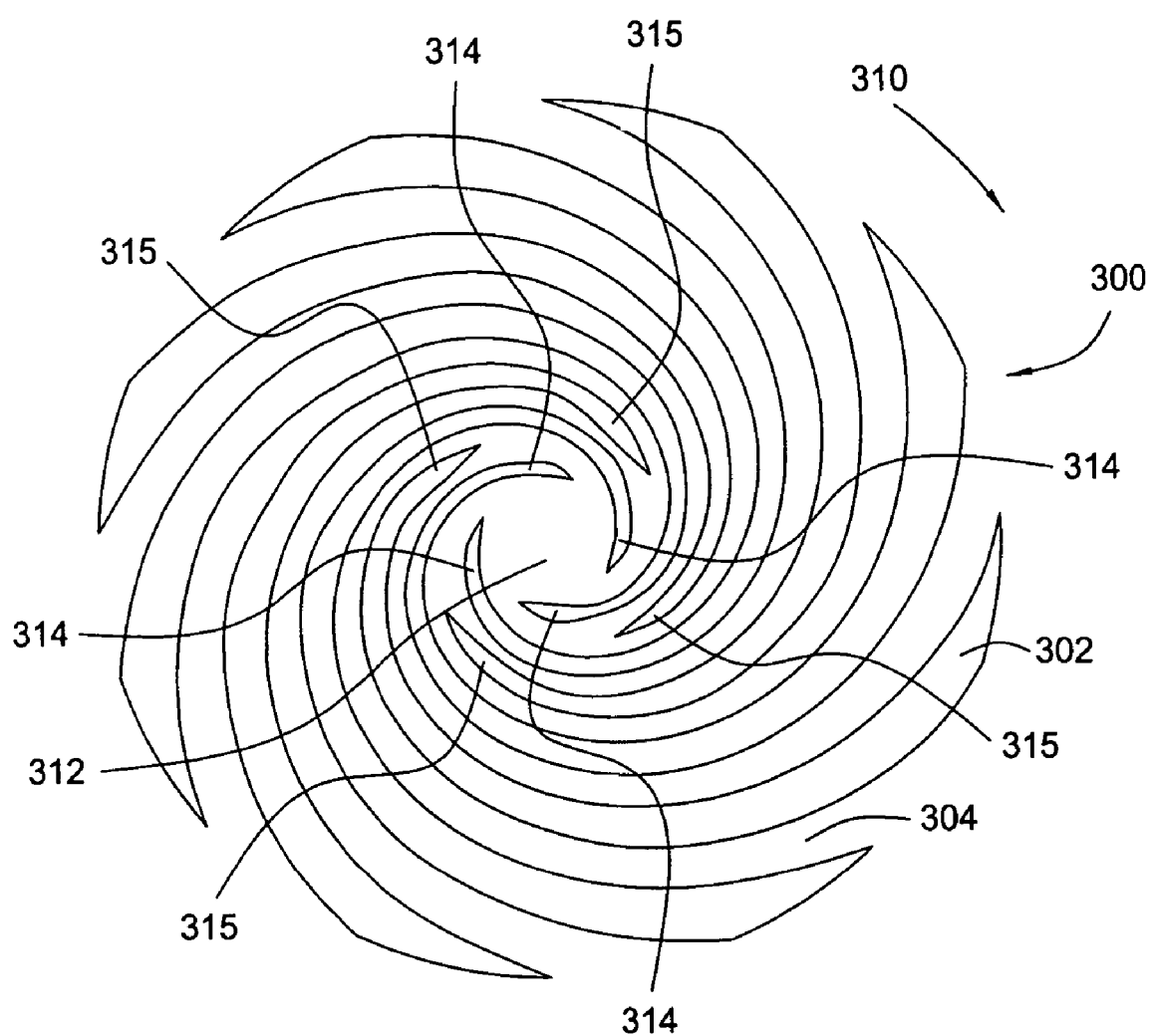
FIG. 3 is a plan view of one groove pattern for a fluid thrust bearing useable in the gap between shaft end and counterplate.

A spiral groove pattern 300 such as is known and used in this field is shown in FIG. 3; however, other groove patterns may be equally useful, and can also be used herein. As will be discussed in greater detail below, this single thrust shaft end spiral groove pattern 300 pressurizes the shaft end to maintain separation between the shaft end and the counterplate during rotational operation of the shaft. This pressurization tends to drive any bubbles which may exist in the fluid in this gap 221 to the outer diameter of the shaft. Some of the grooves in the groove pattern 300 are extended further toward the central axis than others, to optimize the length of the individual groove legs. In FIG. 3, One-half of the grooves in the groove pattern 300 extends further toward the center of the pattern and thus the center axis 312 of the shaft. Specifically, alternate grooves 314 extend closer to the center of the pattern than grooves 315. This feature increases the total grooving pattern length, leading to more effective pressurization. Other patterns utilizing various lengths for different legs are also possible.

In use, the hub assembly 210 and shaft 208 are rotated with respect to the base 100, by means of an electromagnetic motor. The electromagnetic motor as is well known in this field comprises a stator assembly 230 mounted to a shoulder 232 extending upward from the base 100, and a magnet 234 supported from an inner surface 236 of the hub 202.

As can be appreciated from the above description and the appearance of FIG. 2, the hub assembly 202 is supported for rotation with the shaft 208 relative to the base 100 by the fluid journal bearings 213 and 214, and the thrust bearing 219.

The operation of a fluid dynamic bearing can be understood by reference to FIG. 3 which is a plan view of the surfaces of a fluid thrust bearing. The illustrated fluid bearing surface comprises a series of alternating grooves 302 and lands 304. The fluid thrust bearing is formed when the bearing surface which in this case would appear on either the bottom surface of the shaft or preferably the axially facing surface 220 of the counterplate 216 is placed adjacent an opposed bearing surface (which is typically flat and not grooved) with a film of fluid between the two surfaces. When the bearing surface is rotated in the direction 310, the fluid or lubricant between the surfaces tends to be pumped toward the center of the pattern. This creates a pressure distribution within the lubricant which acts to keep the bearing surfaces apart under external loading. In this particular instance, this would serve to keep the end 218 of the shaft 208 rotating over but out of physical contact with the facing surface 220 of the counterplate 216.

By varying the pattern of grooves and lands in a known fashion, the pressure distribution across the fluid dynamic bearing can be varied. Thus, applying the same principles to the journals 213 and 214, by altering the depth or width of the grooves, the number of grooves, or the angle of the grooves, a net flow of lubricant or fluid across the bearing surface in a particular direction can be established. That is, the pattern of grooves and lands of the fluid journal bearings 213, 214, can be arranged to create a net flow of lubricant in the direction along the longitudinal axis of the shaft toward or away from the base 100. In this particular design, it has been established that it is desirable to provide net asymmetry in the journal groove patterns 213, 214 so that the journal bearings create a net flow in the direction of the arrow 244. Preferably grooves 213 will establish a net flow in the direction of arrow 244; typically the journal groove pattern 214 closest to the base will create a pumping tendency for that pattern in the direction of the arrow 246, i.e., toward the separator region between the bearing patterns. It has been established that this will maintain a positive pressure in the region between the journals. It is also been established that the pressure in the direction 244 toward the base should dominate, so that a net downward journal flow toward the thrust bearing 216 is established through the journal bearing. This promotes the fluid recirculation through the system; by providing this recirculation through the radial capillary seal air bubbles are carried out of the journal and purged through the radial capillary seal.

Returning to FIG. 3 (the description of the fluid thrust bearing) the pumping action toward the center of the thrust bearing will have two effects. One of the effects is that as the fluid is pumped toward the center, air bubbles in the fluid (when it is a liquid) will tend to move toward the outer radius. Means are provided below for purging these air bubbles from the system.

A second and equally important effect is that this pumping toward the center will raise the end of the shaft away from the facing surface of the counterplate. It is important for the successful operation of the design, that this axially movement of the shaft away from the counterplate be restrained. Obviously, if the shaft moves too far away from the counterplate, the effectiveness of the thrust bearing is diminished. Means are provided to establish an axial magnetic bias to work against thrust bearing lift and position the shaft axially. Preferably, the magnet 236 is offset from the stator 230. In this way a downward magnetic bias force is established in the direction of the arrow 248 which counters the effect of the thrust bearing pumping action to create separation between the counterplate surface 220 and the shaft end surface 218.

Figure 5:
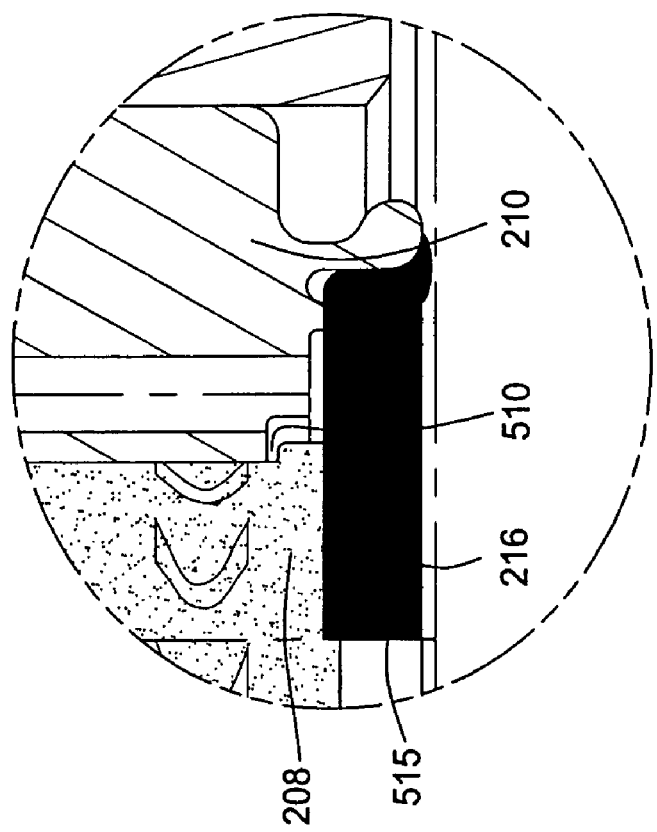
FIG. 5 is an alternative design for a means for relatively axially restraining a shaft against shock displacement.
Figure 4:
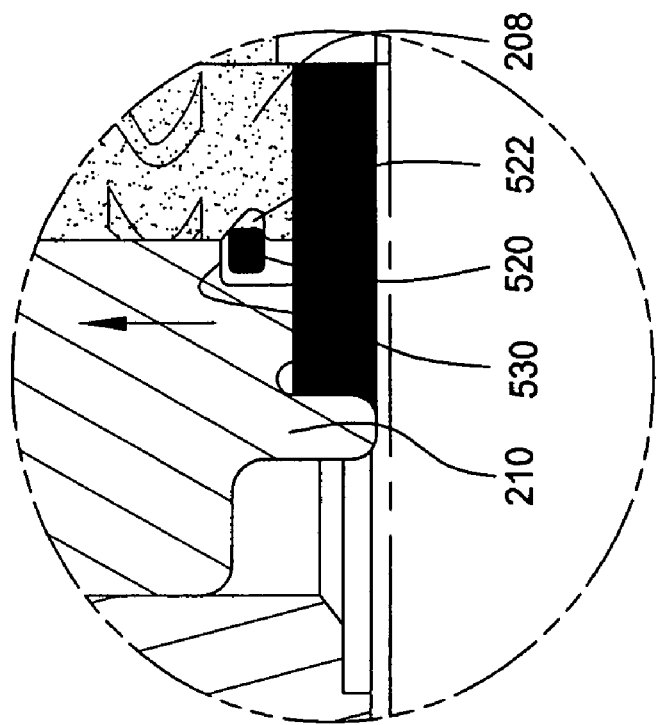
FIG. 4 is a partial vertical sectional view of a means for relatively axially restraining a shaft against shock displacement in a design using a shaft end with a retaining ring, or clip.

Further, features may be defined or incorporated on the end of the shaft to provide a definitive physical restraint against In FIG. 5, the figure shows a shoulder 510 on the end of the shaft 208 protruding beneath the sleeve 210. This shoulder is of sufficient extent to prevent undue physical movement of the shaft 208 away from the counterplate 216. In FIG. 4, a ring clip 520 is provided in a groove 522 defined in the radial surface of the shaft 208. According to this approach, when the shaft is pressed into place upwardly through the sleeve bore, the ring clip 520 which acts as a retaining ring, which captures the shaft in place, both keeping the shaft in its desired axial location and limiting axial travel of the shaft 208. The ring 520 may be either a split ring or a solid ring which is heat shrunk in place in the groove. The ring may be rectangular, circular, or have other cross-section, depending on shock travel design requirements. It should be noted that while the magnetic bias provided by the stator offset magnet 236 tends to keep the shaft in its desired axial location during operation, the shoulder feature 510 or ring clip 520 are important as shock displacement limiters. In FIG. 5, the figure shows a shoulder 510 on the end of the shaft 208 protruding beneath the sleeve 210. This shoulder is of sufficient extent to prevent undue physical movement of the shaft 208 away from the counterplate 216 in the event that shock forces overcome the magnetic bias force.

Figure 6:
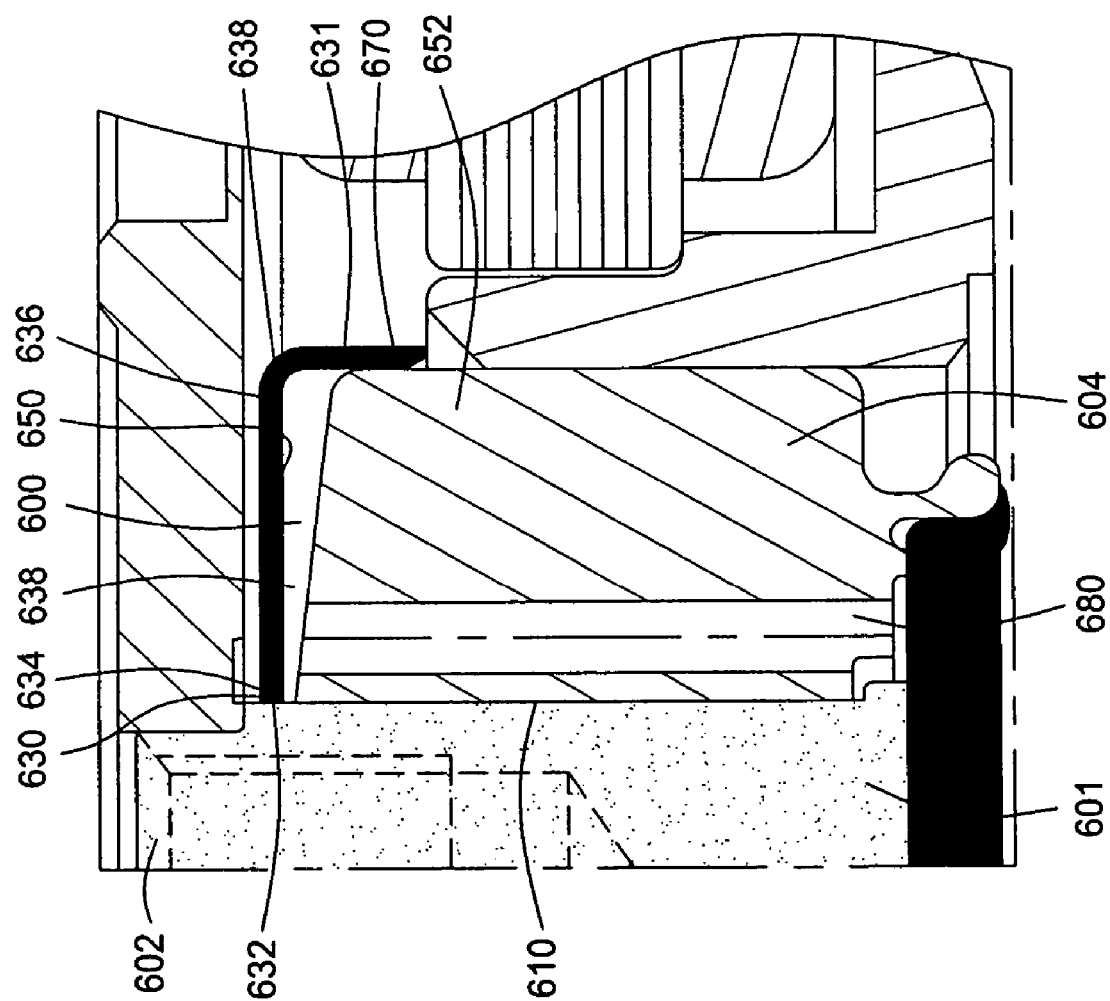
FIG. 6 is a partial vertical sectional view of the embodiment of FIG. 2 illustrating a fluid recirculation path and radial capillary seal.

Two further important features of the present design are provided by a radial capillary seal 260 which serves to both prevent loss of fluid and replenish any fluid which may be lost due to shock or evaporation, and the fluid recirculation path 270 which extends from the thrust bearing region to the radial capillary seal. These features will now be discussed with respect to FIG. 6.

A radial capillary 600 seal is used to maintain fluid in the journal and thrust bearings which support the shaft 602 for rotation in the bore of the sleeve 604 both by preventing fluid loss under shock and providing a reservoir for fluid replacement in the event of evaporation. The radial capillary seal 600 may be thought of as comprising two capillary seals. The first capillary seal is a very narrow opening 630 between the outer surface 632 of the shaft 602 and the radially inner surface 634 of the upper wall 636 of the reservoir 638. This very narrow annulus 630 establishes a capillary which provides very high shock resistance against fluid loss from the journal region as well as a favorably small surface area from which evaporation may occur. The thickness of the radially extending wall 636 whose end 634 forms one side of this capillary is relatively large compared to the width of the annulus 630. As a further enhancement to this first capillary seal 630, small grooves may be defined on one of the two facing surfaces 632, 634 of the seal so that relative rotation of the two surfaces causes a pumping of the fluid back toward the journal bearing defined between the shaft and sleeve. The radial width of this gap is typically but not limited to about 0.015 to 0.03 mm; this provides a very strong capillary retentive force and high shock resistance.

The radial capillary seal design further comprises a capillary seal and reservoir 638. This reservoir is defined between the generally axially facing surface 652 of sleeve 604 and a facing surface 650 of a radial wall or cover 631 supported from the sleeve 602. This cover 631 can be held in place either by adhesive or by spring tension, i.e., by forcing or press fitting or heat shrinking the cover 631 over the outer surface 670 of sleeve 604 or other stable surface. As can be seen, the two surfaces 652 and 650 diverge slightly in an axially direction as the radial distance from the shaft 602 increases so that a capillary sealing effect is established. This second seal 638 which is a diverging wall radial capillary seal also serves as a fluid reservoir, holding a substantial volume of fluid in the region to replace any fluid which may be lost from the system by evaporation.

This reservoir 638 may also be used to fluid fill the system, by providing one or more fill holes extending axially into this reservoir region 638. An oil fill hole allows for both the initial filling of the reservoir and venting air as the internal oil volume changes. By keeping this oil fill hole small, and radially displaced from the shaft toward an outer end of the reservoir, filling the reservoir is relatively easy. Little of the vertical height of the motor needs to be devoted to the capillary seal and the reservoir.

The motor design of this invention also preferably uses a flow recirculation and air purging channel 680 which extends from a region adjacent the thrust bearing 601 to the radial capillary seal 600. The cooperation between the radial capillary seal described above and the fluid recirculation path 680 will next be described. These two features cooperate with the rest of the above described design to provide a long lasting bearing design, and eliminate or purge air bubbles which can cause deterioration of the long term operation of the system. Designs of fluid dynamic bearings are susceptible to problems caused by tolerance induced variations in bearing and grooving geometry. These problems include variations in pressure produced by the journal bearing and the entrapment of air bubbles in the oil or fluid. If air bubble formation is to be avoided there is no easy way to remove air unless recirculation is provided. It is also desirable to provide a recirculation path to the external environments to which air bubbles can be purged. In this design, the asymmetry-induced flow in the journal bearing and the pressure distribution in the thrust bearing work together to drive air bubbles out of bearing regions and into the recirculation path from which they are then purged at the radial capillary seal lock.

By using this design, the oil filling of the system can be done by injecting a fixed amount of oil into the radial capillary seal through fill hole 735. This is made possible by the fact that from reservoir 730 in this concept comprises means for purging air, unlike conventional single thrust plate designs which are open on one end, and cannot purge air. This filling and continuous air purging system appears in FIG. 7. Capillary attraction and recirculation flow will fill the journal bearing region 705 from reservoir 730 706, and recirculation of the oil as shown by the arrows 700, 710, 715 in FIG. 7 purges air bubbles. The asymmetry described above in the journal grooving region which generates a bias pumping in the direction of the arrow 700 toward the thrust bearing 702 forces oil to flow down the journal 705, away from the radial capillary seal 706 and toward the opposite end of the shaft i.e., thrust bearing region 702. The fluid then flows through the plenum region 720 away from the shaft end as shown by arrow 710 into the recirculation hole 714 (arrow 715) and up the recirculation hole 714 into the radial capillary seal volume 730. This flow direction 715 causes a slight pressure increase in the volume or plenum region 720 which connects the bottom of the journal bearing to the recirculation hole 714. Any air bubbles trapped in the plenum region such as air bubbles ejected from the thrust bearing 702 will follow the decreasing pressure gradient up the recirculation hole and into the radial capillary seal.

Figure 7:
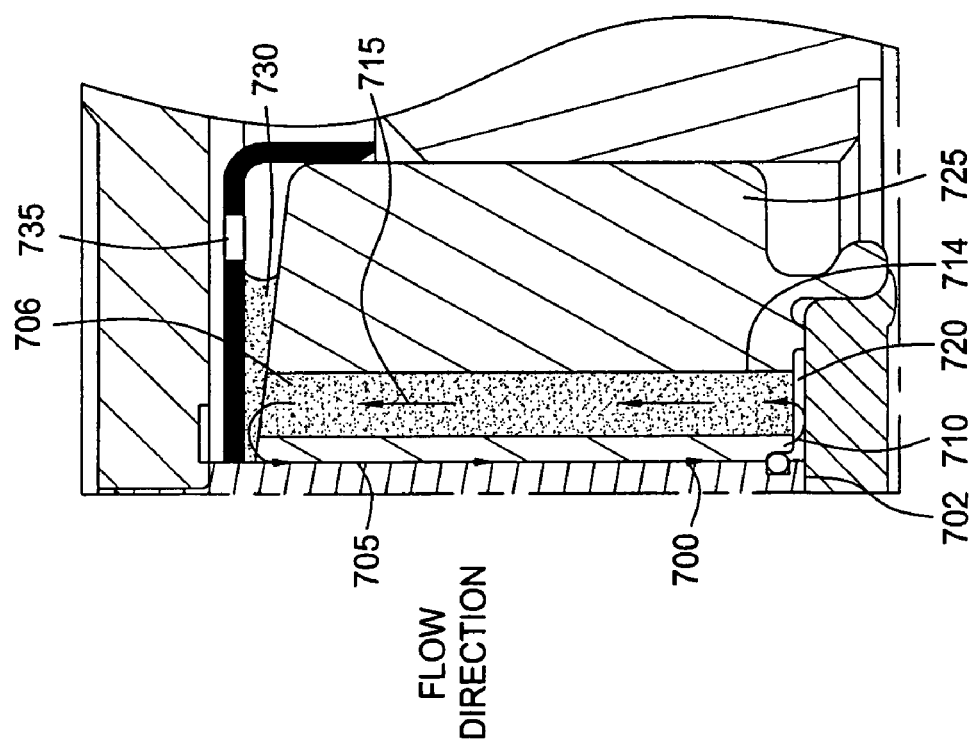
FIG. 7 illustrates a diagramatic view of a pressure distribution within a journal bearing.

The converging shape of the horizontal capillary seal described with respect to FIG. 7 will cause air bubbles to migrate to the meniscus 730 on the outer diameter of the oil volume and leave the seal via the vent hole 735. It should be noted that one or more recirculation holes 714 through sleeve 725 may be used, and one or more vent holes, 735 may be used. The flow resistance of the recirculation holes is usually established to be much lower than the flow resistance of the journal region 705. This results in the effective cancellation of any pressure build-up along the length of the journal 705 (the journal is short circuited by the recirculation holes). The pressure at the bottom of the journal adjacent the thrust bearing region (the plenum region 720) is forced to be virtually atmospheric, i.e., the static pressure in the radial capillary seal.

It should also be remembered that the inward pumping spiral thrust pattern on the bottom of the shaft (described with respect to FIGS. 2 and 3, and comprising the preferred embodiment) will establish a pressure gradient resulting in increased pressure from the thrust surface outer diameter to the inner diameter, causing air bubbles to travel into the plenum region 720 and then into the recirculation holes.

Figure 8:
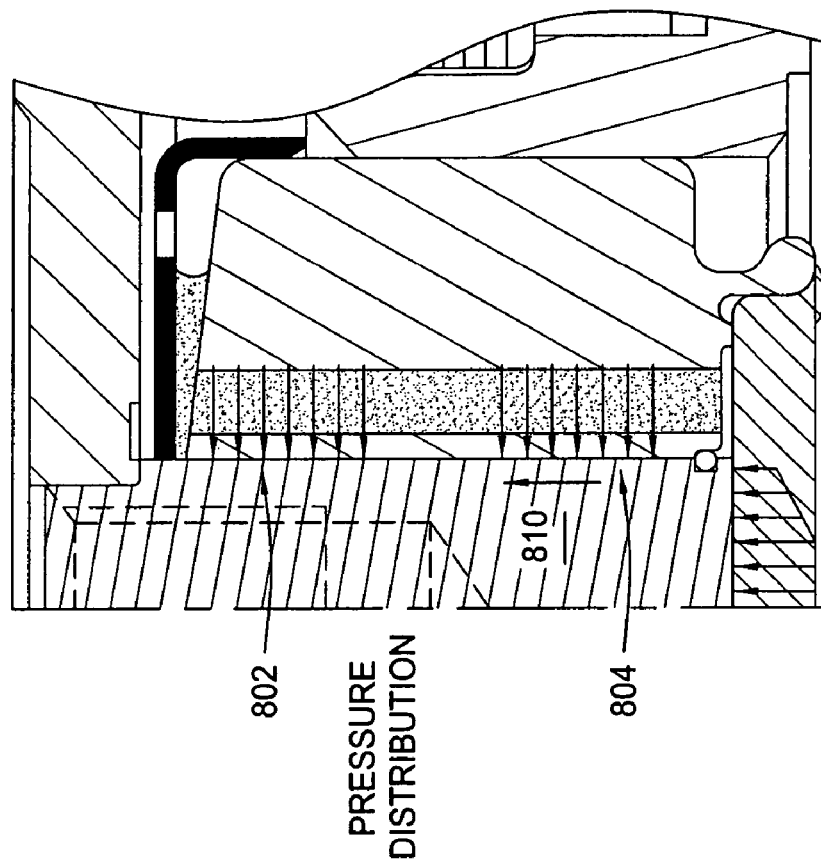
FIG. 8 illustrates a flow pattern in a combined recirculation path and radial capillary seal respectively.

As noted above, the circulation flow is also established and supported by the journal bearing asymmetry described with respect to FIG. 2 and further detailed in FIG. 8. That is, as described therein, the upper journal bearing pressure distribution 802 which can be seen diagrammatically in FIG. 8 will provide greater downward pumping force than the upward journal pumping force established by the lower journal bearing 804 which is closer to the thrust bearing.

It should also be noted that in considering the above description, that the asymmetry of the journal bearing described above with respect to FIGS. 7 and 8 have little or no hydraulic effect to the end of the shaft due to journal asymmetry pressure acting on the shaft end, as such effect is [effectively] vented away by the recirculation hole 714. This fact improves the ability of the stator/magnet offset to optimize the performance and balance of the entire system.

Also in preferred embodiments of this invention some coating may be desirable on either the shaft end or facing surface of the counterplate, such as a DLC coating or other wear resistant coating, to minimize the possibility of undue wear caused by the shaft coming to rest on the surface of the counterplate.

Figure 9A:
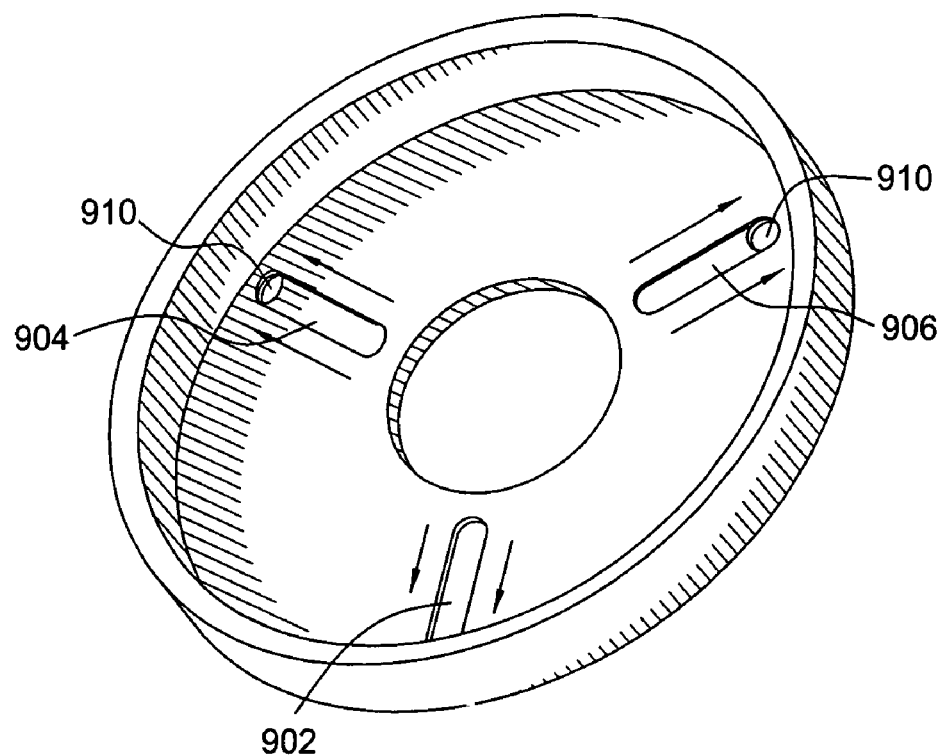
FIG. 9A is a perspective view of a cover for the radial capillary seal.
Figure 9B:
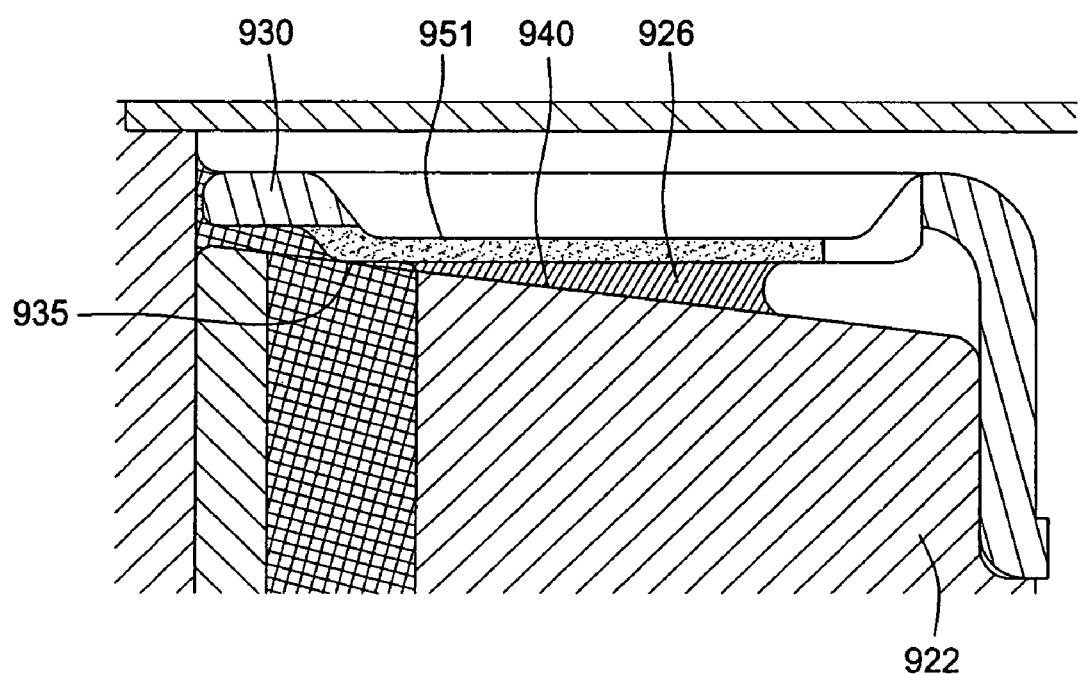
FIG. 9B is a cross-sectional detail view of the cover and sleeve.
Figure 9C:
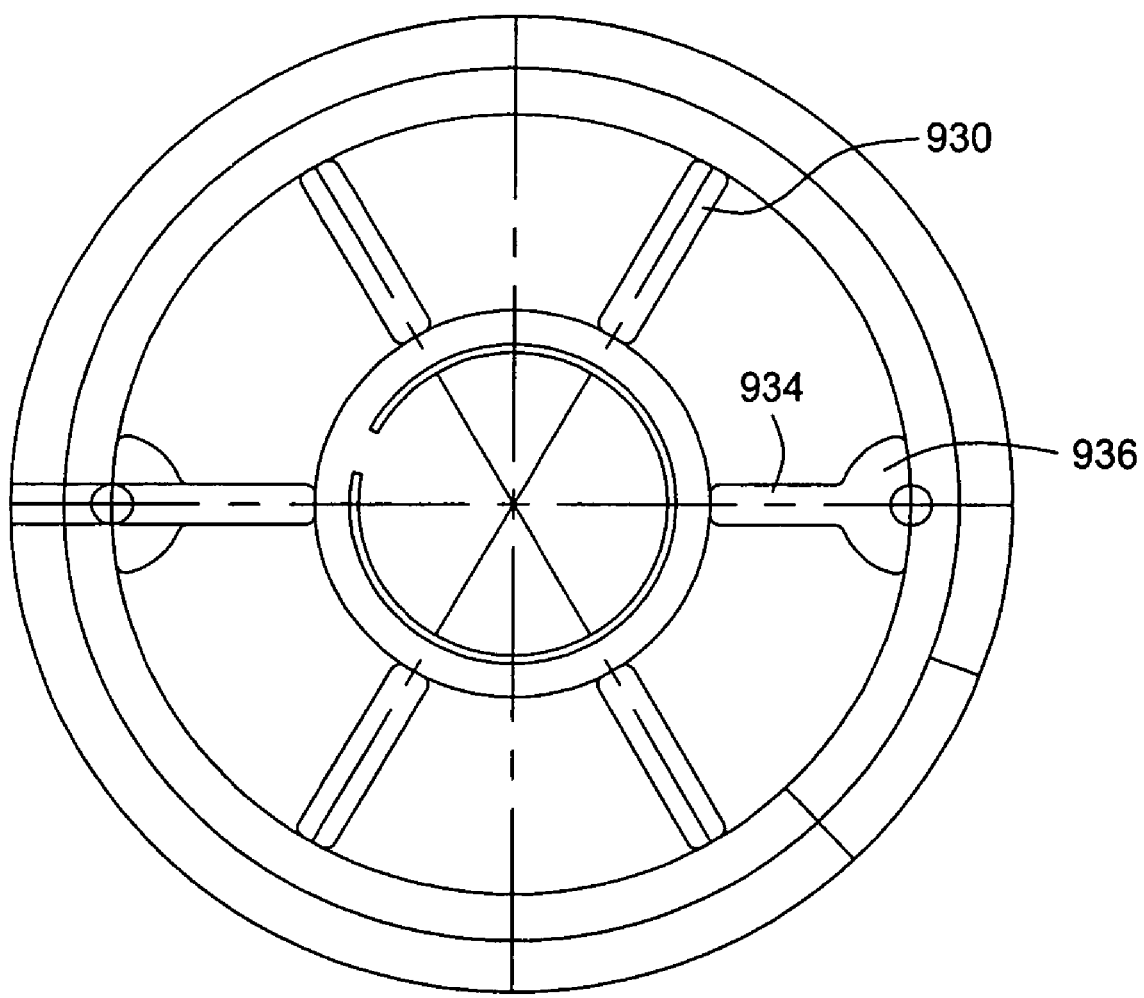
FIG. 9C is a plan view of an alternate embodiment of the cover of FIG. 9A.

FIGS. 9A, 9B, and 9C provide view of an enhanced design of a cover for the radial capillary seal previously described. In this design, ribs 902, 904, 906 are defined protruding into and extending radially across the reservoir cover. These ribs preferable extend from the fill holes 910 radially inward toward the inner radius of the cover. Preferably, as can be seen in each of the figures, the ribs extend from the fill holes 910 to approximately the radial location of recirculation path bores 920 extending axially through the sleeve 922. In a preferred form, the rib is deep enough so that it rests against the top of the sleeve at its innermost end. In this way, the rib will serve a height-setting function for the reservoir 926 of the radial capillary seal. The rib may extend either to overlie the recirculation bore 920 or may rest on the top of the sleeve intermediate the axial bores which serve as recirculation paths. This feature is in addition to the rib serving a stiffening function for the cover which defines the top surface of the radial capillary seal. Finally the ribs set the height of the 935 cover over the sleeve, the radially inner end of each rib rests on the surface 940 of sleeve 922. This effectively establishes the spacing of the surfaces 940, 951 of the radial capillary seal.

The rib or ribs additionally provide the functions of aiding in positioning the fluid within the reservoir. More specifically, when fluid is introduced into the radial capillary seal 926, the ribs 902, 904 and 906 which are adjacent the fill holes provide means for wicking of the fluid toward the inner diameter of the radial capillary seal. Further, because the ribs extend to and even partially surround the fill holes 910, they cause any oil which may be splashed toward the outer diameter of the reservoir under shock to circumvent the fill hole so that oil does not splash out through the fill hole 910. The ribs then return the fluid toward the inner radius by a wicking process which is facilitated by the radial angular convergence between the lower surface of each rib 902, 904, 906 and the facing surface of the sleeve.

Additional features of a preferred embodiment appear in FIG. 9C where additional ribs 930 are provided extending radially along the cover but position circumferentially between the fill holes to further aid in distributing the fluid in the reservoir, as well as stiffening the cover, and axially locating the cover against the sleeve. This FIG. 9C also shows a preferred form for the ribs which extend to about the center of the fill holes; such ribs each comprise a radial portion 934 and a flared portion 936 which surrounds the fill hole to aid in deflecting any fluid splash away from the fill holes. The flared portion of the ribs can take on various shapes. Finally it should be noted that preferably at least 3 ribs are provided so that the cover is properly aligned parallel to reservoir 926 further at least 2 fill holes should be provided.

Other features and advantages of this invention will be apparent to a person of skill in the art who studies this description. Therefore, the scope of the invention is to be limited only by the following claims.

What is claimed is:

1. A disc drive motor comprising:
   a sleeve;
   a shaft and a hub supported for rotation relative to the sleeve;
   a fluid dynamic bearing including a journal bearing established in a gap between the shaft and the sleeve, and a thrust bearing established in a gap between an end surface of the shaft and a facing surface of a counterplate supported from the sleeve;

a radial capillary seal comprising a first capillary seal defined between opposed respective surfaces of the shaft and the sleeve, a narrow end of the first capillary seal formed proximate the journal bearing, and a second capillary seal defined between first and second opposed generally radially extending and relatively irrotatable surfaces, in fluidic communication with the fluid dynamic bearing, a narrow end of the second capillary seal disposed proximal the journal bearing, and having a fluidic volume larger than the first capillary seal; and at least one recirculation path extending from the radial capillary seal for purging air bubbles from the journal bearing.

2. A disc drive motor as claimed in claim 1, wherein the at least one recirculation path comprises at least one bore extending through the sleeve substantially parallel to the shaft.

3. A disc drive motor according to claim 1, wherein the journal bearing comprises:

at least one set of grooves formed on interfacial surfaces of the gap between the shaft and the sleeve;

fluid in the gap; and the at least one set of grooves configured for pumping fluid toward the thrust bearing.

4. A disc drive motor as claimed in claim 3, comprising a groove pattern formed on one of the counterplate surface and the shaft end surface, the thrust bearing being connected to the journal bearing.

5. A disc drive motor as claimed in claim 4, wherein the groove pattern formed on one of the counterplate surface and the shaft end surface pumps fluid radially inward toward a central axis of the shaft.

6. A disc drive motor according to claim 5, comprising a plenum region directing the fluid from the journal bearing and/or the thrust bearing to the at least one recirculation path.

7. A disc drive motor as claimed in claim 6, wherein the at least one set of grooves formed on interfacial surfaces of the gap between the shaft and the sleeve pump fluid toward the thrust bearing with sufficient force to carry air bubbles through the gap between the shaft and the sleeve, through the plenum region and the at least one recirculation path, and through the radial capillary seal.

8. A disc drive motor as claimed in claim 7, wherein the at least one set of grooves formed on interfacial surfaces of the gap between the shaft and the sleeve comprise first and second sets of grooves, separated axially along the shaft, the first set of grooves being distal from the thrust bearing gap end of the shaft and pumping downward toward the second end of the shaft.

9. A disc drive motor as claimed in claim 8, wherein the first and second sets of grooves, separated axially along the shaft, are both designed with sufficient asymmetry to pump toward the region of the shaft between the first and second sets of grooves, thereby maintaining positive pressure between the first and second sets of grooves.

10. A disc drive motor as claimed in claim 9, wherein the groove pattern formed on one of the counterplate surface and the shaft end surface pumps fluid inwardly with sufficient force to drive air bubbles by a pressure gradient in the fluid to an outer diameter of the end surface of the shaft and into the plenum region and the at least one recirculation path.

11. A disc drive motor as claimed in claim 10, further comprising a shoulder on the second end of the shaft adapted to extend beneath a facing surface of the sleeve to act as an axial shock displacement limiter for the shaft relative to the sleeve.

12. A disc drive motor as claimed in claim 11, including means for establishing an axial magnetic force against the shaft and the thrust bearing supporting the shaft.

13. A disc drive motor as claimed in claim 12, wherein an axial center line of a magnet supported from the hub is axially offset from an axial center line of a stator to establish an axial bias force on the hub and the shaft between the shaft and the counterplate.

14. A disc drive motor as claimed in claim 1 further comprising:

a ring clip engaged with a groove on the shaft and a surface of the sleeve providing a physical restraint preventing displacement of the shaft away from the counterplate.

15. A disc drive motor comprising:

a sleeve;

a shaft and a hub supported for rotation relative to the sleeve;

a fluid dynamic bearing including a journal bearing established in a gap between the shaft and the sleeve, the journal bearing comprising at least one set of grooves formed on one or more of respective facing surfaces of the shaft and the sleeve, and a thrust bearing established in a gap between an end surface of the shaft and a facing surface of a counterplate supported from the sleeve, wherein lubricating liquid is disposed in the journal bearing and the at least one set of grooves are formed for pumping lubricating liquid toward the thrust bearing;

a radial capillary seal; and at least one recirculation path extending from the radial capillary seal for purging air bubbles from the journal bearing.

16. A disc drive motor as claimed in claim 15, wherein the at least one recirculation path comprises at least one bore extending through the sleeve substantially parallel to the shaft.

17. A disc drive motor as claimed in claim 15, comprising a thrust groove pattern formed on one of the counterplate facing surface and the shaft end surface, the thrust bearing being fluidically coupled to the journal bearing.

18. A disc drive motor as claimed in claim 17, wherein the thrust groove pattern is for pumping fluid radially inward toward a central axis of the shaft.

19. A disc drive motor according to claim 18, comprising a plenum region for directing the fluid from the journal bearing and/or the thrust bearing to the at least one recirculation path.

20. A disc drive motor as claimed in claim 15, further comprising means for establishing an axial magnetic force biasing the shaft in an equilibrium with a thrust force generated by the thrust bearing during motor operation.

* * * * *